(12) United States Patent
Hyust et al.

(10) Patent No.: US 12,310,536 B2
(45) Date of Patent: May 27, 2025

(54) RETAINING DEVICE FOR TRUSSING AND COOKING FOWL

(71) Applicant: TURBO TRUSSER LLC, Canton, OH (US)

(72) Inventors: Kirk W. Hyust, Canton, OH (US); Brian Halasinski, Canton, OH (US)

(73) Assignee: TURBO TRUSSER LLC, Canton, OH (US)

( * ) Notice: Subject to any disclaimer, the term of this patent is extended or adjusted under 35 U.S.C. 154(b) by 723 days.

(21) Appl. No.: 17/665,161

(22) Filed: Feb. 4, 2022

(65) Prior Publication Data

US 2023/0078992 A1    Mar. 16, 2023

Related U.S. Application Data

(63) Continuation-in-part of application No. 17/473,127, filed on Sep. 13, 2021, now Pat. No. 11,737,605.

(51) Int. Cl.
*A47J 43/18*   (2006.01)
*A22C 21/00*   (2006.01)

(52) U.S. Cl.
CPC ........... *A47J 43/18* (2013.01); *A22C 21/0038* (2013.01)

(58) Field of Classification Search
CPC .............................. A22C 21/0038; A47J 43/18
USPC ........................................................... 99/426
See application file for complete search history.

(56) References Cited

U.S. PATENT DOCUMENTS

| 2,189,421 | A |   | 2/1940  | Huschka  |           |
|-----------|---|---|---------|----------|-----------|
| 3,877,109 | A | * | 4/1975  | Moncrief | A47J 43/18 |
|           |   |   |         |          | 452/174   |
| 4,421,017 | A |   | 12/1983 | Ross     |           |
| 5,380,241 | A | * | 1/1995  | Volk     | A22C 21/0038 |
|           |   |   |         |          | 452/176   |
| 5,735,736 | A |   | 4/1998  | Volk     |           |
| 6,016,744 | A |   | 1/2000  | Pritsker |           |

* cited by examiner

*Primary Examiner* — Dana Ross
*Assistant Examiner* — Joseph W Iskra
(74) *Attorney, Agent, or Firm* — Hudak, Shunk & Farine Co. LPA

(57) ABSTRACT

A retaining device for trussing and cooking fowl and a method for utilizing the same. The device is adaptable to fowl of differing sizes and can easily and quickly truss, for example, chickens, turkeys, ducks, game hens, and other waterfowl that can be cooked and consumed. The device includes a main body having a pair of leg cradles formed internally within a plate adapted to be disposed adjacent a rear end of the fowl. A pair of wing locks are adjustably connected to the main body and include wing pins located at an end thereof which are adapted to be passed through a portion of the fowl wing and hold it firmly against the fowl body in order to allow even cooking and provide an excellent presentation of the fowl. The device is reusable and therefore environmentally friendly.

19 Claims, 16 Drawing Sheets

RETAINING DEVICE FOR TRUSSING AND COOKING FOWL

FIELD OF THE INVENTION

The present invention relates to a retaining device for trussing and cooking fowl and a method for utilizing the same. The device is adaptable to fowl of differing sizes and can easily and quickly truss, for example, chickens, turkeys, ducks, game hens, and other waterfowl that can be cooked and consumed. The device includes a main body having a pair of leg cradles formed internally within a plate adapted to be disposed adjacent a rear end of the fowl. A pair of wing locks are adjustably connected to the main body and include wing pins located at an end thereof which are adapted to be passed through a portion of the fowl wing and hold it firmly against the fowl body in order to allow even cooking and provide an excellent presentation of the fowl. The device is reusable and therefore environmentally friendly.

BACKGROUND OF THE INVENTION

Fowl must be trussed in order to hold the extremities of the bird close to the body in order to cook the fowl evenly and without substantially drying out or even burning the wings and legs of the fowl.

The art includes many different solutions for trussing a fowl. Some of the solutions are time consuming and somewhat complicated.

Traditional trussing utilizes string to tie the legs and wings to the body of the fowl, which is a time consuming process.

Other solutions include utilizing plastic rings and clips to connect the legs of a fowl together. However, such devices do not connect the legs to the wings. One problem with plastic rings is that they cannot be utilized in a deep fryer or near an open flame.

Numerous devices have been disclosed in the prior art:

U.S. Pat. No. 2,189,421 relates to fowl-dressing appliances and has particular reference to appliances for temporarily closing an access opening formed in the belly of a fowl for its dressing or stuffing.

U.S. Pat. No. 3,877,109 relates to a holder for a fowl having a neck, wings and legs, particularly for use in turnspit roasting of the fowl, and includes a metal bar configured to provide a central loop adapted to encircle a truncated portion of the neck of the fowl. Side portions of the configured bar are symmetrically disposed with respect to the loop and extend along the fowl sides to overlie the fowl wings. The two ends of the bar are configured to afford confronting U-shaped portions which hook around and restrain the legs of the fowl.

U.S. Pat. No. 4,421,017 relates to a device for aiding in the preparation of fowl (10) on a rotisserie having a spit (11), the spit (11) extending longitudinally through the fowl (10) between the wings (12) and between the legs (13) thereof. A leg clip (15) fixedly positions the legs (13) of the fowl (10) relative to the spit (11). The wings (12) are held in place by a truss member (24) which is held by a pin (22) extending through the body of the fowl (10).

U.S. Pat. No. 5,380,241 relates to a poultry hock truss for use with a body of eviscerated poultry having hocks and comprising a unitary substantially coplanar thin plastic member. The plastic member includes an anchor element adapted for attachment to the body of eviscerated poultry. A pair of side portions extend upwardly and outwardly from the anchor element and terminate in inwardly curved upper ends. An upper transverse crosspiece joins the inwardly curved upper ends of the side portions and a tab portion depends approximately from the midpoint of the upper transverse crosspiece toward the anchor element. The upper transverse crosspiece, the tab portion, the side portions and the anchor element define a generally heart-shaped opening with first and second juxtaposed lobes. The lobes of the heart-shaped opening are formed to hold the hocks together in juxtaposition.

U.S. Pat. No. 5,735,736 relates to a retainer for use with a body of eviscerated fowl having first and second legs with respective hocks. The retainer includes a unitary substantially planar thin plastic member which mounts about the hocks. The thin plastic member has an outer portion defining an opening which is elongated and of sufficient size to receive the legs. A plurality of protuberances integral with the outer portion extend inwardly into the opening for engaging the legs so as to hold the legs in a position extending perpendicular to the thin plastic member substantially parallel to each other when the thin plastic member is mounted about the hocks.

U.S. Pat. No. 6,016,744 relates to a poultry retainer for retaining poultry having a strap for closing the rear opening of the poultry and a piercing member for piercing the skin and holding the skin over the front opening to close the front opening. The poultry retainer also includes a base having first and second pieces which are slidably connected together to provide an adjustable distance between the strap and piercing member for accommodating varying size poultry. Wing holders and a leg clip draw the wings and legs toward the body of the poultry to reduce drying of the wings and legs during cooking.

SUMMARY OF THE INVENTION

In view of the above, the art still needs a retaining device for trussing and cooking fowl such as, but not limited to, chickens, turkeys, ducks, game hens and other edible water fowl. Furthermore, the art still needs a device that assists in even cooking of the fowl. Additionally, the art still needs a device that can be used in multiple cooking appliances. Still further, the art needs a device that is reusable and dishwasher safe for easy cleanup.

The problems of the prior art and others are solved by the present invention which provides a retaining device for trussing and cooking fowl. The device includes a first wing lock and a second wing lock adjustably connected to a main body and can be adapted to accommodate fowl of differing sizes, whereby the fowl is held tightly together and can therefore be cooked evenly and provide an aesthetically pleasing presentation after cooking.

The device is versatile and can be utilized in many different cooking devices including, but not limited to, an oven, roaster, smoker, grill, deep fryer, air fryer, dutch oven, rotisserie or the like.

Still further, the device is reusable and therefore environmentally friendly. The device also can be cleaned utilizing typical appliances such as dishwashers.

In one aspect a retaining device for trussing and cooking fowl is disclosed comprising a main body including a plate having a first leg cradle, a second cradle and a central aperture adapted to allow a spit to pass through the main body from a first, outer side to a second, inner side; wherein the plate is adapted to be disposed adjacent a rear end of the fowl, wherein the first leg cradle and second leg cradle each including an aperture formed within the plate and adapted to at least accommodate a leg of the fowl, wherein the first leg cradle and second leg cradle are separated from the central aperture; and a first wing lock and a second wing lock, each for securing a wing of the fowl to a body of the fowl, each wing lock including a) a segment adjustably connected to the main body located at a fist end of the wing lock and b) a wing pin located at a second end of the wing lock adapted to be passed through a portion of the fowl wing and the fowl body.

In a further aspect a retaining device for trussing and cooking fowl is disclosed comprising a main body including a plate having a lateral direction and a height, the plate including a first leg cradle located at a first lateral end and a second leg cradle located at a second lateral end of the main body, wherein the first leg cradle and the second leg cradle each include an aperture formed within the plate and adapted to at least accommodate a leg of the fowl, wherein the first leg cradle and the second leg cradle each include an outer band that forms a portion of a perimeter of the first and second leg cradle apertures, the plate further including a wing lock carrier including at least two apertures spaced around the first leg cradle aperture and at least two apertures spaced around the second leg cradle aperture; and a first wing lock and a second wing lock for securing a wing of the fowl to the body of the fowl, each wing lock including a segment adjustably connected to an aperture of the wing lock carrier, wherein each wing lock includes a wing pin located at a second end of the wing lock adapted to be passed through a portion of a fowl wing and a fowl body.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
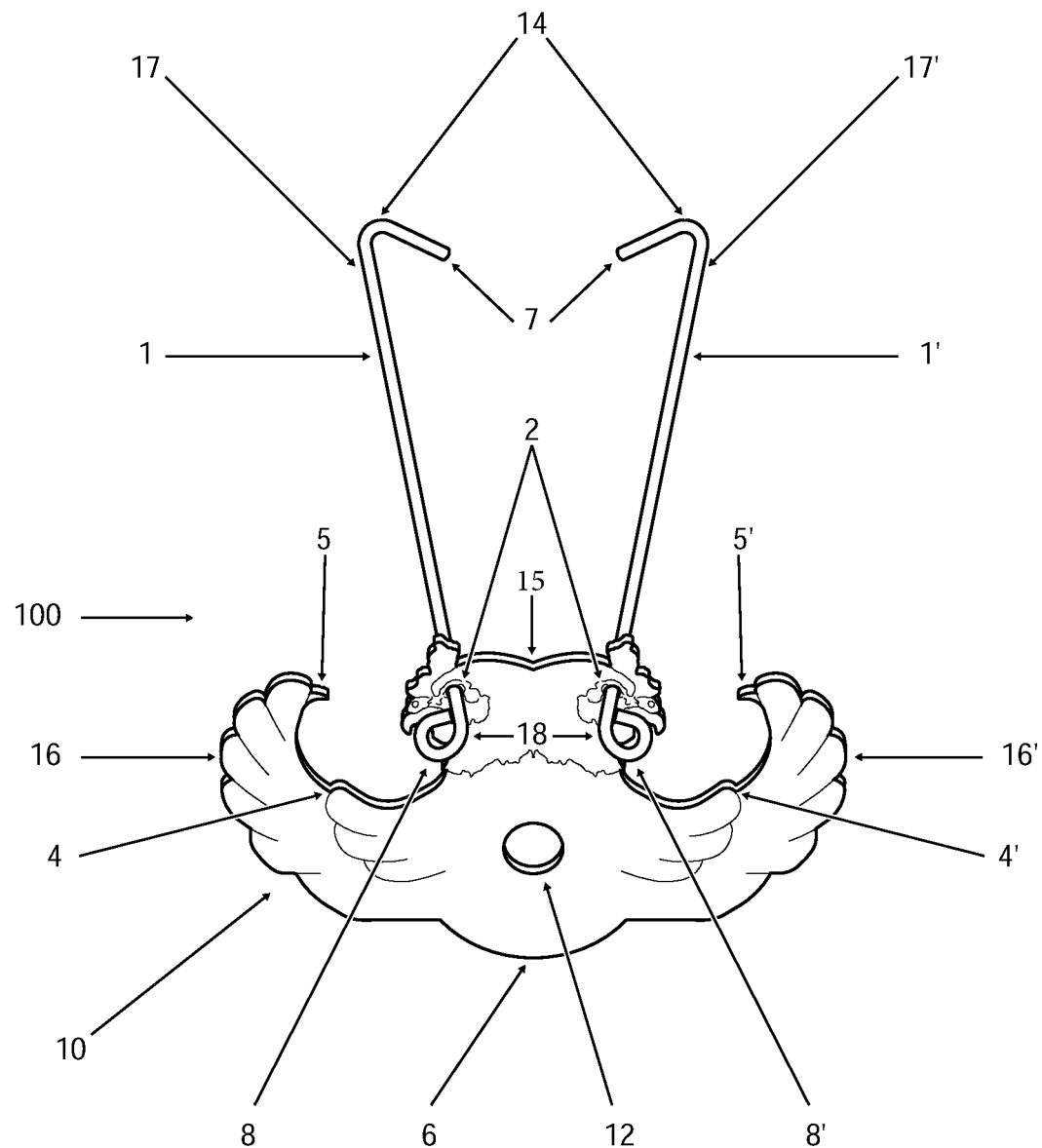
FIG. 1 is a downward-looking front perspective view of one embodiment of a device of the present invention.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 14:
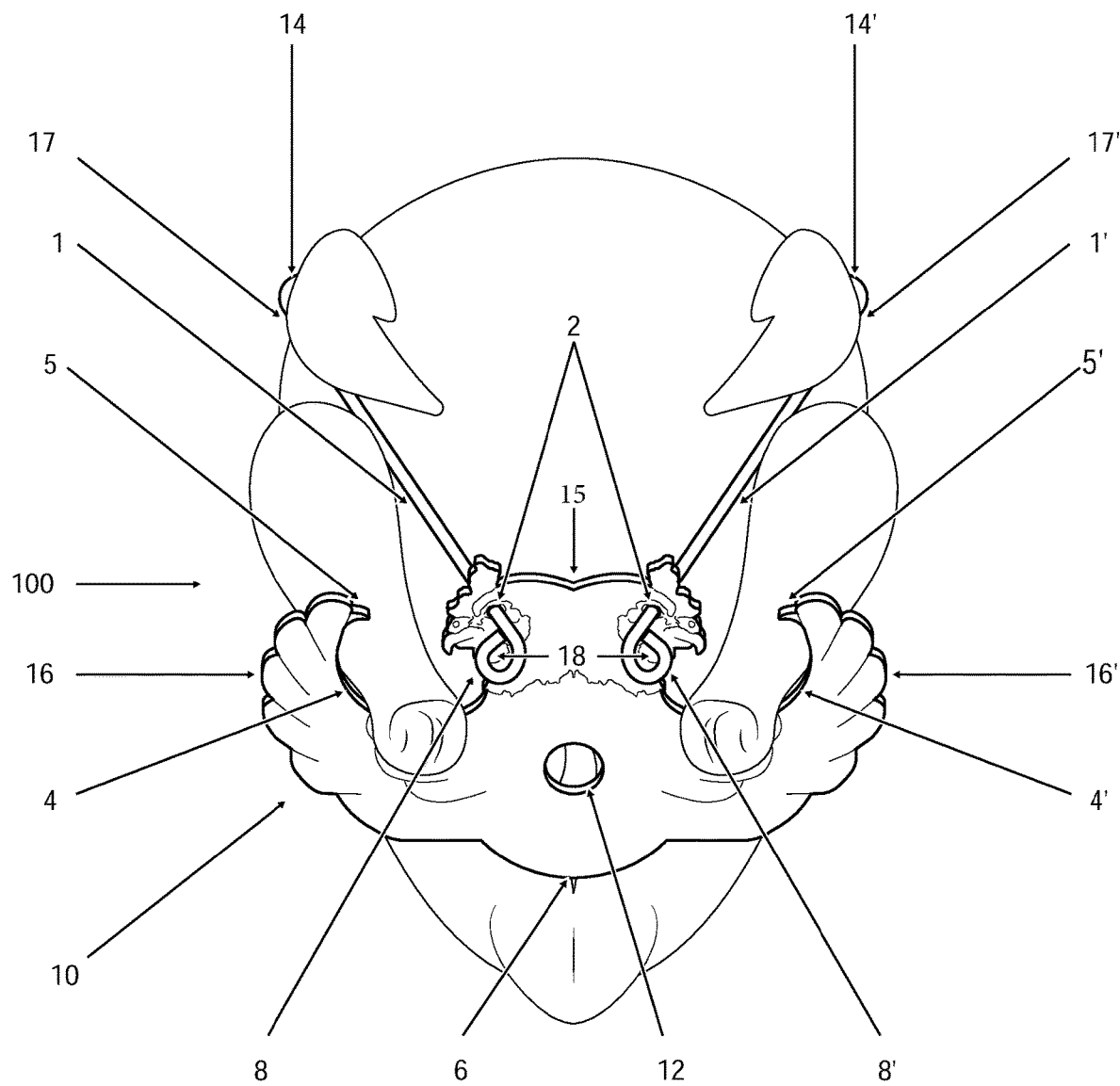
FIG. 14 illustrates a fowl operatively connected to the device illustrated in FIG. 1.

Turning now to the drawings, wherein like reference numbers refer to like or similar components throughout the specification, FIG. 1 illustrates one embodiment of a retaining device 100 for trussing and cooking fowl including a main body 10 generally constructed in the form of a plate or other elongated structure having a lateral length, a height, as well as a depth. The depth of the plate can vary depending upon the desired function and/or aesthetic appearance of the main body. The main body includes a first leg cradle 4 and a second leg cradle 4', with each leg cradle adapted to accept and hold a leg of a fowl. FIG. 14 shows a fowl, namely a chicken arranged in relation to the device 100. Main body 10 includes a central aperture 12 adapted to allow a spit, rod or the like to pass therethrough from a first, outer side to a second, inner side, with the inner side being adapted to be disposed adjacent a rear end of the fowl.

The leg cradles 4,4' each include an opening on an upper surface of the plate, with each opening extending downwardly a distance from the upper surface of the plate.

The leg cradles 4,4' are located between lateral ends of the plate, with the central aperture 12 being located between the first leg cradle 4 and the second leg cradle 4' when considered in the lateral direction.

Main body 10 includes a first arm 16 and a second arm 16' located at an outer end of the plate. The outer arms 16 and 16' include a leg locking point 5 and 5', respectively. The openings that form the leg cradles 4,4' are undercut into the outer arms below the leg locking points 5, 5'.

Main body 10 further includes a wing lock carrier 14 located laterally between the outer arms 16, 16'. The wing lock carrier includes at least two apertures 2, 2'. A portion of wing lock 1 passes through one of the wing lock carrier apertures 2 and a second portion of the second wing lock 1' passes through the other wing lock carrier aperture 2, see also FIG. 8. In one embodiment, a wing lock carrier aperture 2 is located at a vertical height that is greater than or equal to the vertical height of the leg locking points 5,5'. The advantage to this design is, at that height, the wires go straight to the wings without pushing into the breast of the bird and the wings are easier to attach because the wires are not bent.

The main body can be formed of any suitable material and is preferably a metal such as stainless steel, titanium or other rigid material that is resistant to high heat and corrosion.

Central aperture 12 is located below the wing lock carrier 14 in a direction perpendicular to the lateral direction. A butt rest 6 is located below the central aperture 12.

First wing lock 1 and second wing lock 1' each secure a wing to the body of the fowl. Each wing lock 1, 1' includes a segment adjustably connected to the main body located a first end 18,18' of the wing lock. Each wing lock 1, 1' also includes a wing pin 7 located at a second end 17,17' of the wing lock adapted to be passed through the portion of the wing and body for securing the wing to the fowl body. The distance between the distal end of the wing pin and the main body 10 of the device is adjustable to accommodate different types and lengths of fowl. The wing lock first end 18,18' includes a stop 8,8' larger than the wing lock carrier aperture 2 that prevents the first end 18,18' of the wing lock from being withdrawn from the wing lock carrier aperture through the wing lock first end. The stop 8,8' is shown as a partial loop in various figures.

The wing lock second end 7,7' wing pin 7 includes a bent segment 14 having an angle less than 90°. A distal end of the wing pin 7 is located closer to the main body as compared to the bent segment 14 as clearly illustrated in FIG. 1.

The wing locks 1, 1' are removable from the main body 10 by pulling the wing lock 1,1' second end 17,17' towards the aperture 2 and manipulating the second end about the aperture in order to pull the wing lock out of the aperture. The wing locks 1,1' can be inserted or can be connected to the main body utilizing the opposite procedure. Being able to separate the main body from each wing lock allows easy cleaning of each component of the retaining device 100.

To utilize the device the butt of the fowl is positioned on the inner side of the main body 10 and one leg is placed in each cradle 4,4'. The wing locks 1,1' are then adjusted in relation to the main body and the wing pin 7 hooks the wing of the fowl in order to hold the fowl wing in a fixed position against the fowl body without puncturing the breast. The opposite force from the legs and wings hooked together and the "V" of the wire position pulls the wings towards body 10. Also, the angle of the wing hook will go through the wing and rest on the breast. If the angle were greater it would puncture the breast.

The method for trussing a fowl is easily completed by a user of the device, who needs no special skill in order to truss a fowl.

The wing locks are also formed from a durable material, preferably a metal such as stainless steel, titanium or the like. Stainless steel wing locks are preferred in one embodiment. The retaining device 100 of the present invention maintains the fowl in a tight configuration that keeps the legs and wings bound together and also keeps air out of the cavity of the bird by blocking the airflow due to the configuration of the main body. By blocking the air flow, cooking time is sped up and a more evenly cooked, juicer fowl is produced. Furthermore, when stuffing is utilized inside the cavity of the bird, the device aids in keeping the stuffing inside the bird without falling out.

The wing locks and carrier form a substantially "V" shaped configuration and contour to the shape of a breast of the fowl bird. The distal end includes a point which allows the wing lock to easily penetrate the wing tip, which is mostly cartilage, or anywhere else. By having an angle of less than 90° on the second end 17,17' of the wing lock 1,1' the wing is prevented from becoming detached from the fowl body while cooking. The breast of the fowl is generally wider towards the head and wings. As the breast moves towards the tail, it becomes narrower. Accordingly, the wing lock being placed closer together at their first ends follows the contour of the shape of the fowl, travelling beside the breast and between the leg and the breast where they intersect.

Figure 2:
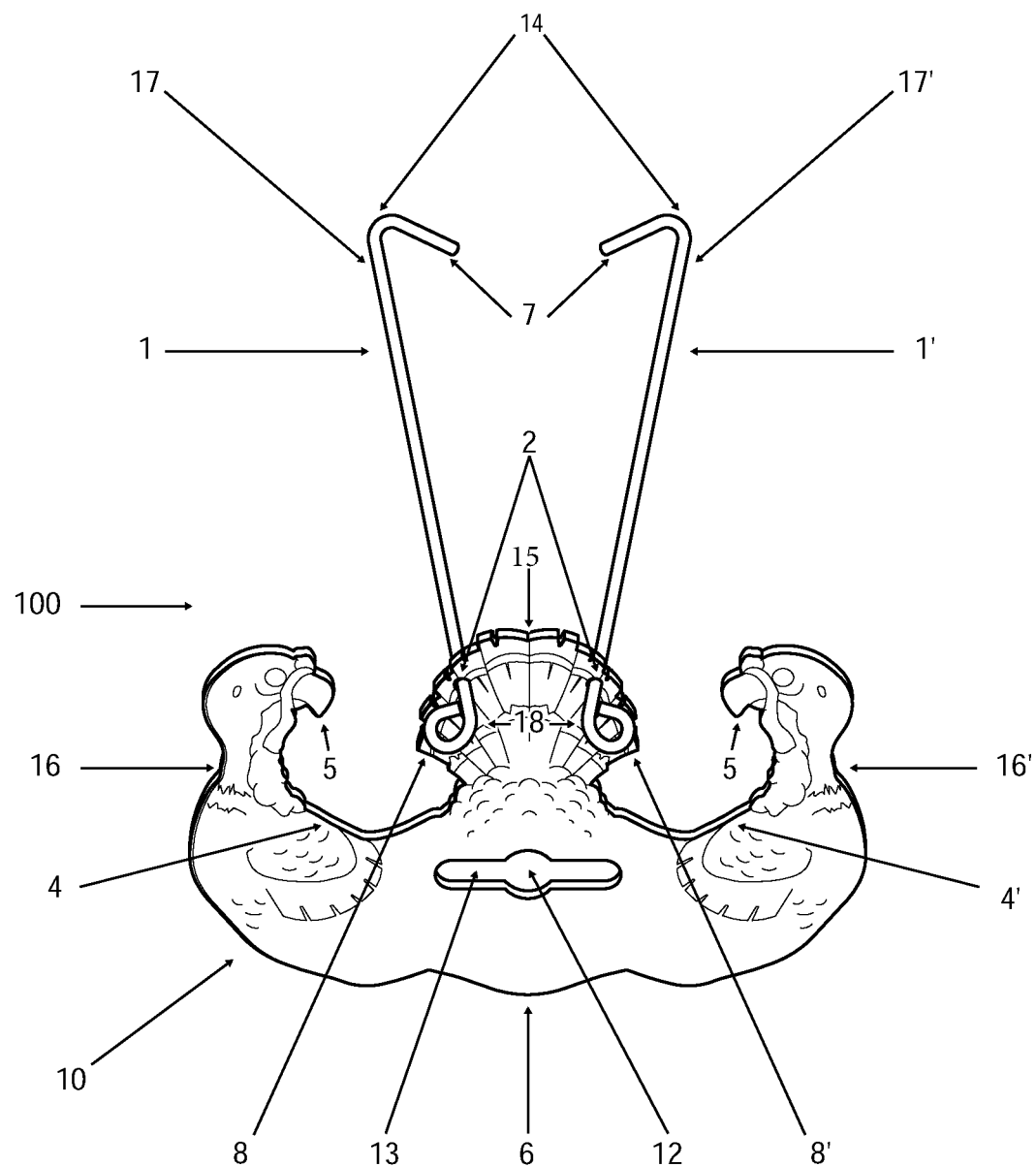
FIG. 2 is a downward-looking front perspective view of another embodiment of a device of the present invention.

The embodiment of FIG. 2 illustrates a main body 10 having an ornamental appearance depicting a pair of turkeys. Central aperture 12 in this case is formed as a slot having an enlarged central portion, particularly suitable for use in deep frying.

Figure 3:
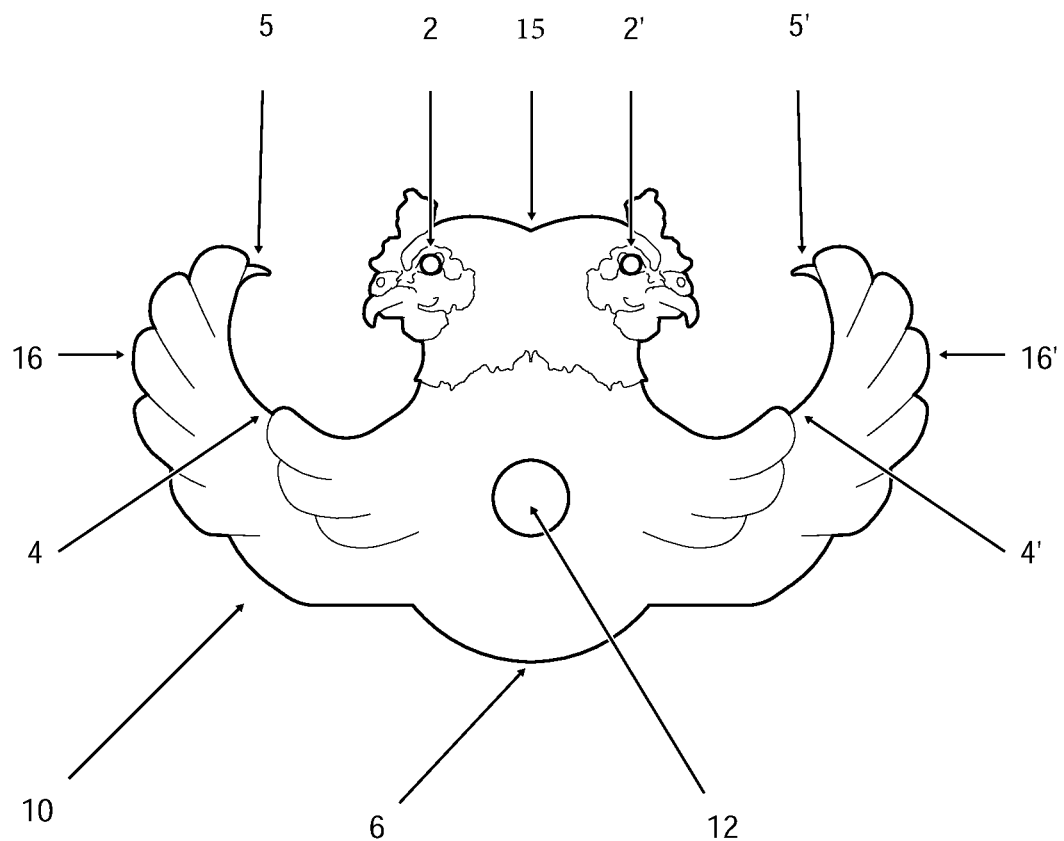
FIG. 3 is a front view of the main body of the device illustrated in FIG. 1.

FIG. 3 depicts a front view of main body 10 and particularly illustrates apertures 2 without the wing locks extending therethrough.

Figure 4:
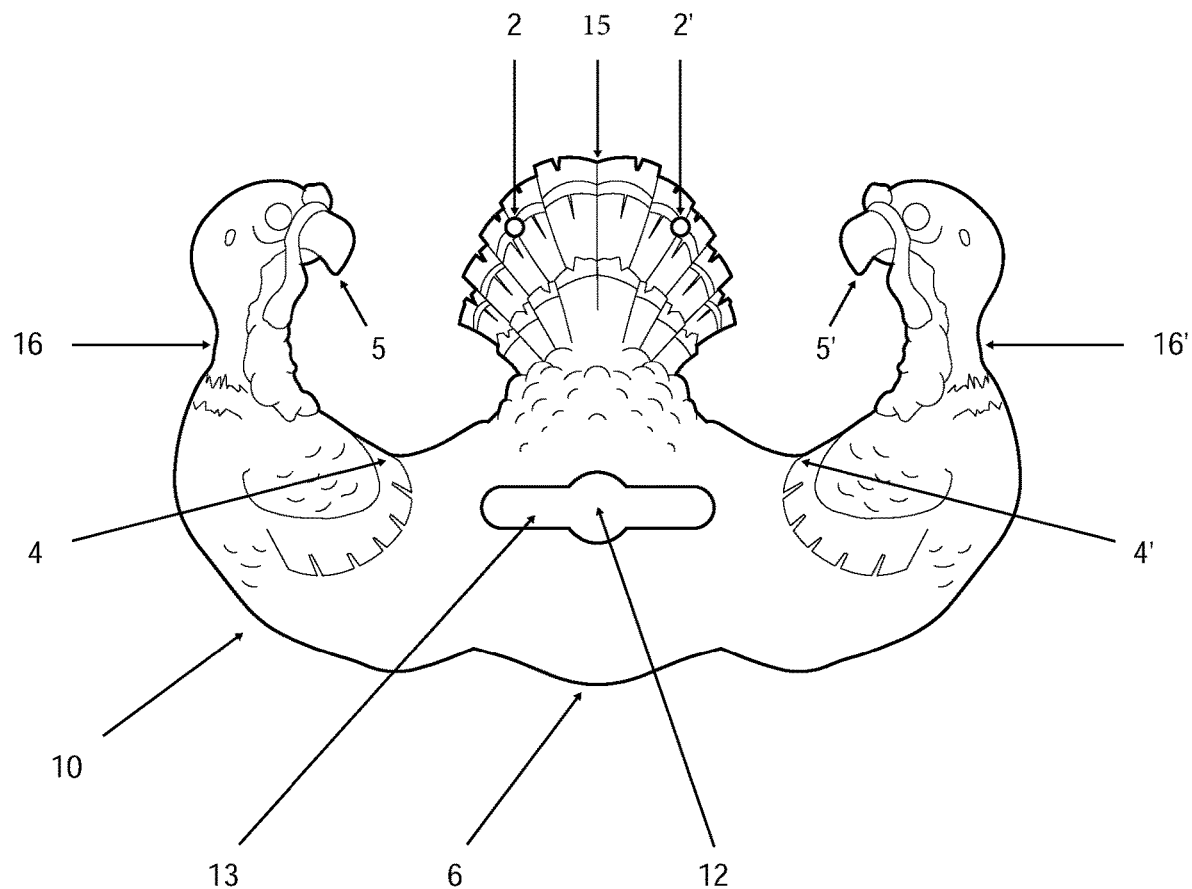
FIG. 4 is a front view of the main body of the device illustrated in FIG. 2.

FIG. 4 depicts the main body 10 of FIG. 2.

Figure 5:
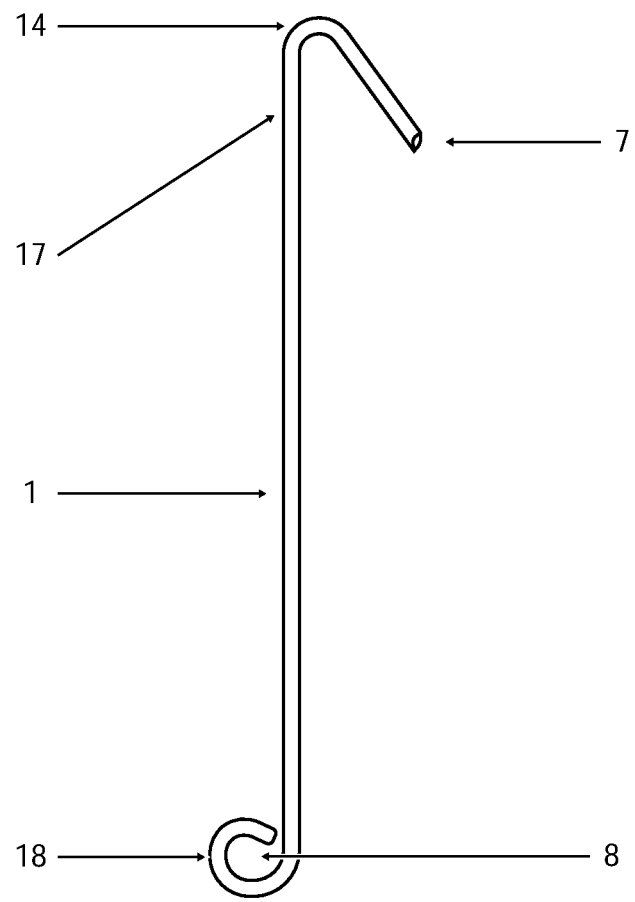
FIG. 5 is a side view of one embodiment of a wing lock of the present invention.

FIG. 5 illustrates a side view of wing lock 1, including stop 8, formed as a bend in the wire used to form the wing lock. The bent segment 14 has an angle less than 90°.

Figure 6:
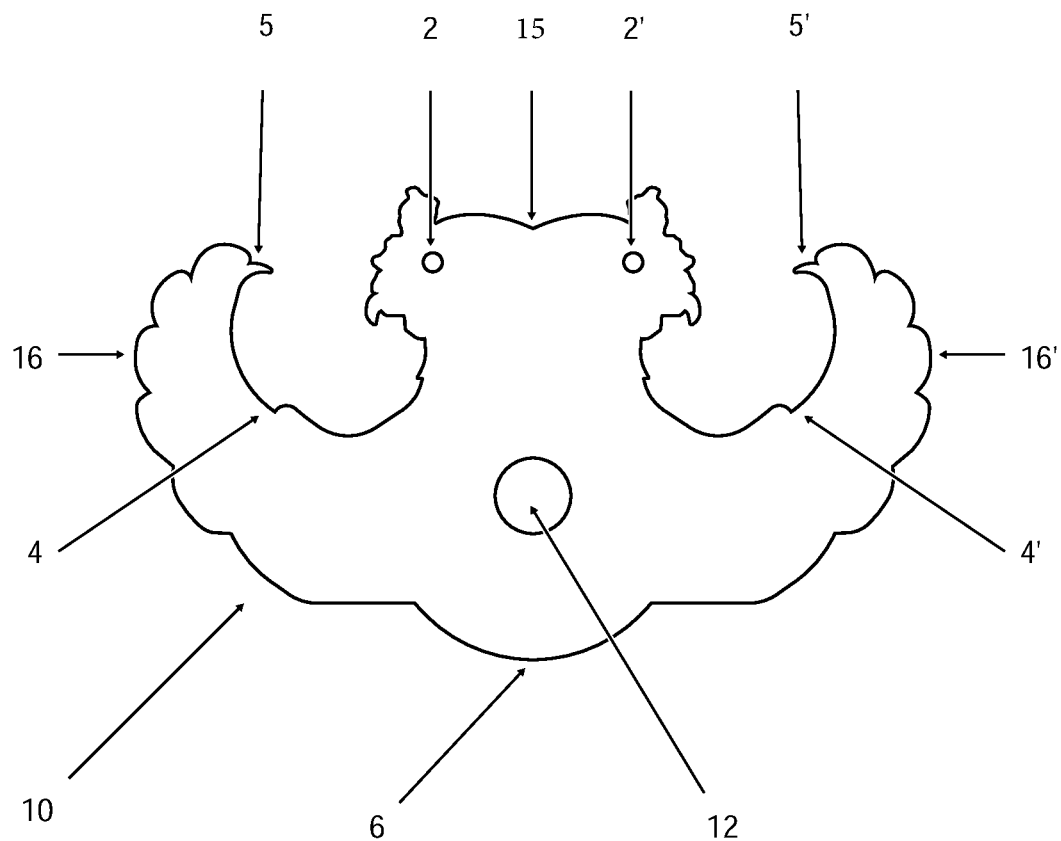
FIG. 6 is a rear view of the main body illustrated in FIG. 1.

FIG. 6 illustrates a rear view of the main body 10 of FIG. 1.

Figure 7:
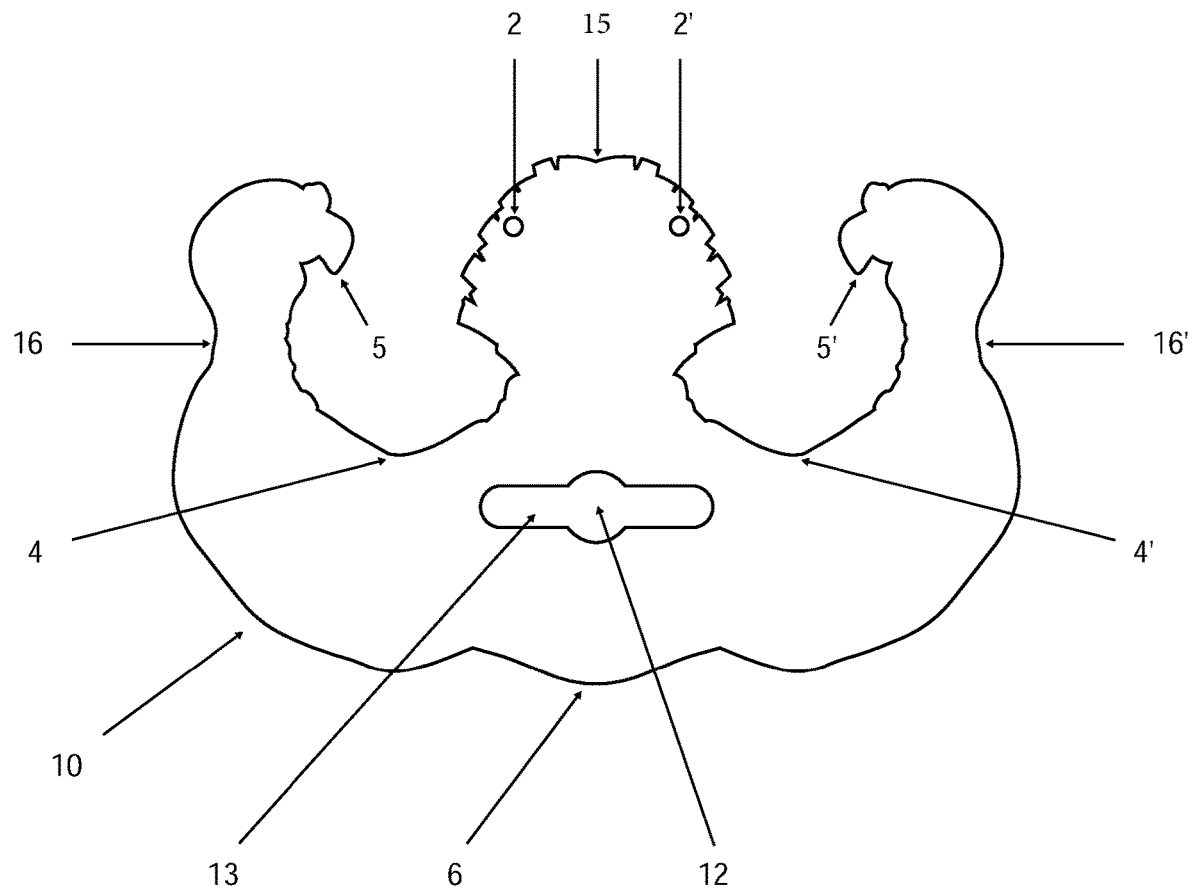
FIG. 7 is a rear view of the main body illustrated in FIG. 2.

FIG. 7 illustrates a rear view of the main body 10 of FIG. 2.

Figure 8:
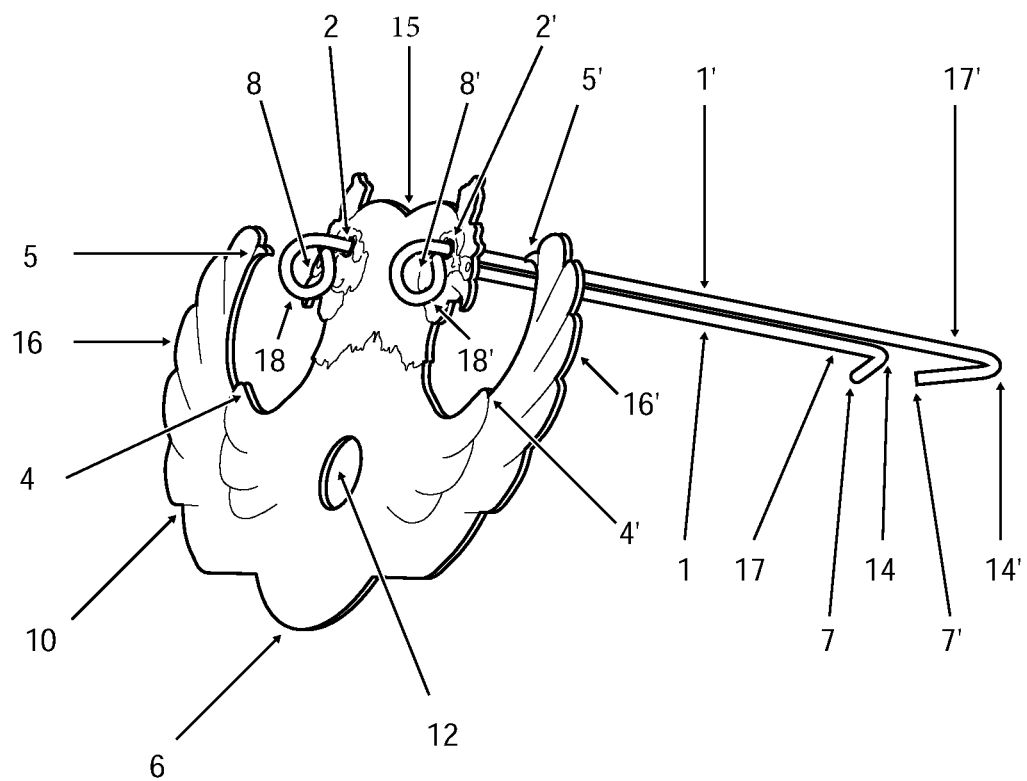
FIG. 8 is a front right perspective view of the embodiment illustrated in FIG. 1.

FIG. 8 is a perspective view of the embodiment shown in FIG. 1.

Figure 9:
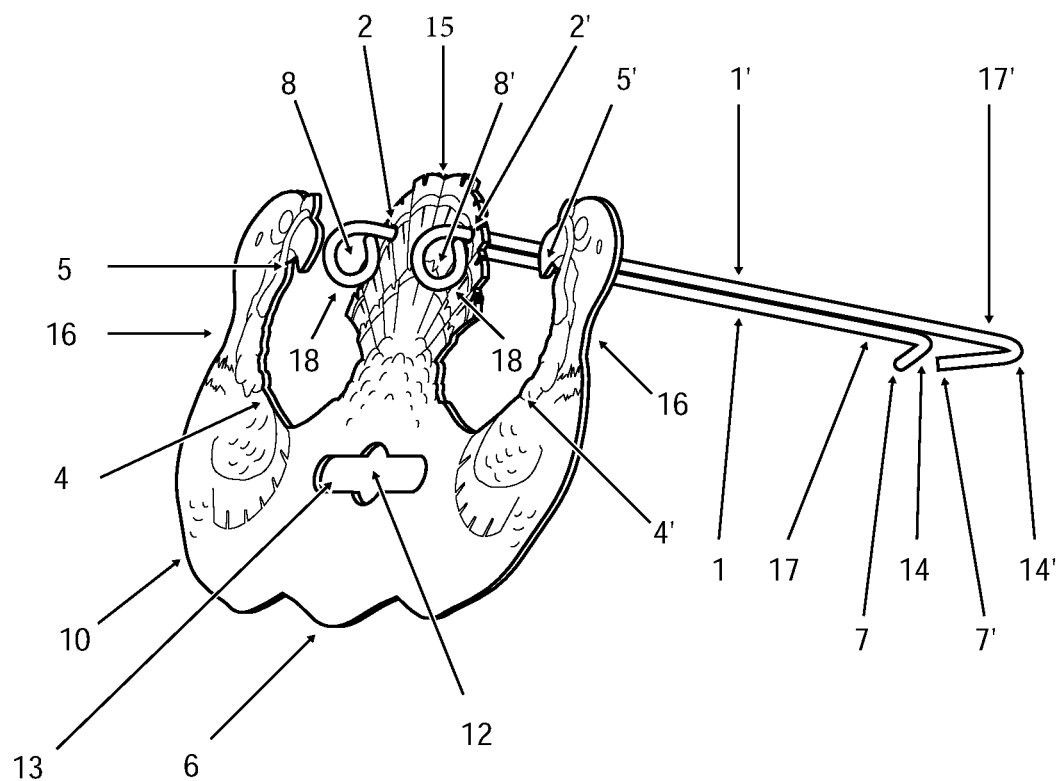
FIG. 9 is a front right perspective view of the embodiment illustrated in FIG. 2.

FIG. 9 is a perspective view of the embodiment show in FIG. 2.

Figure 10:
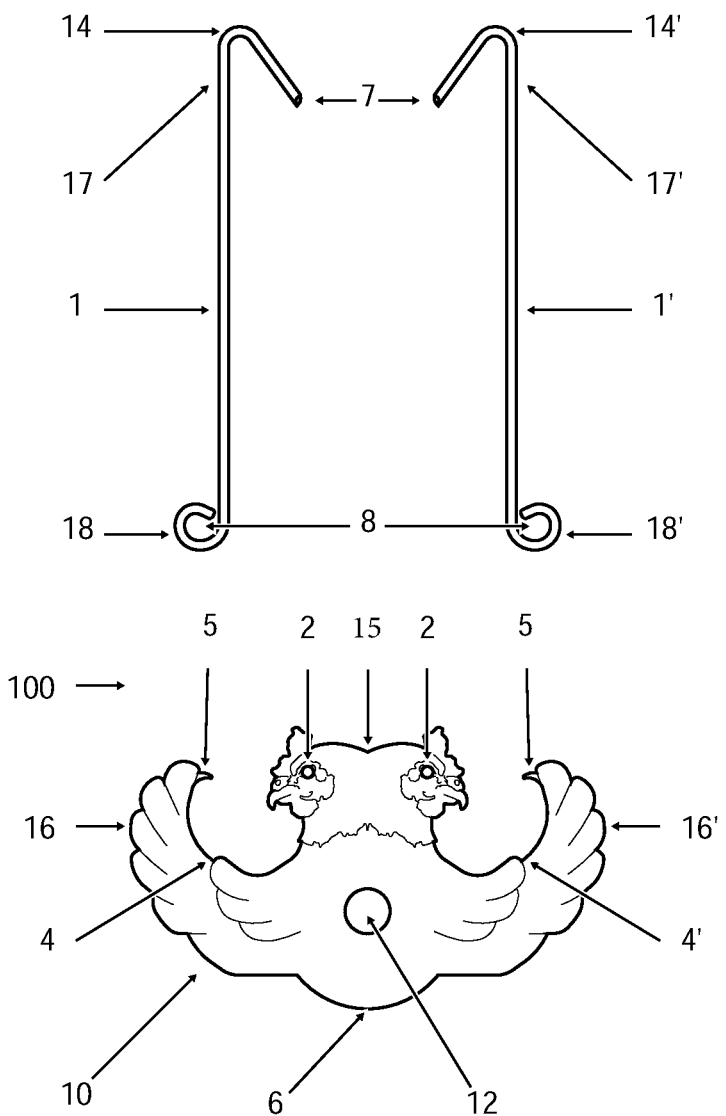
FIG. 10 illustrates individual components of the device illustrated in FIG. 1.

FIG. 10 illustrates a component view of the three primary components utilized to form the device that is shown in FIG. 1.

Figure 11:
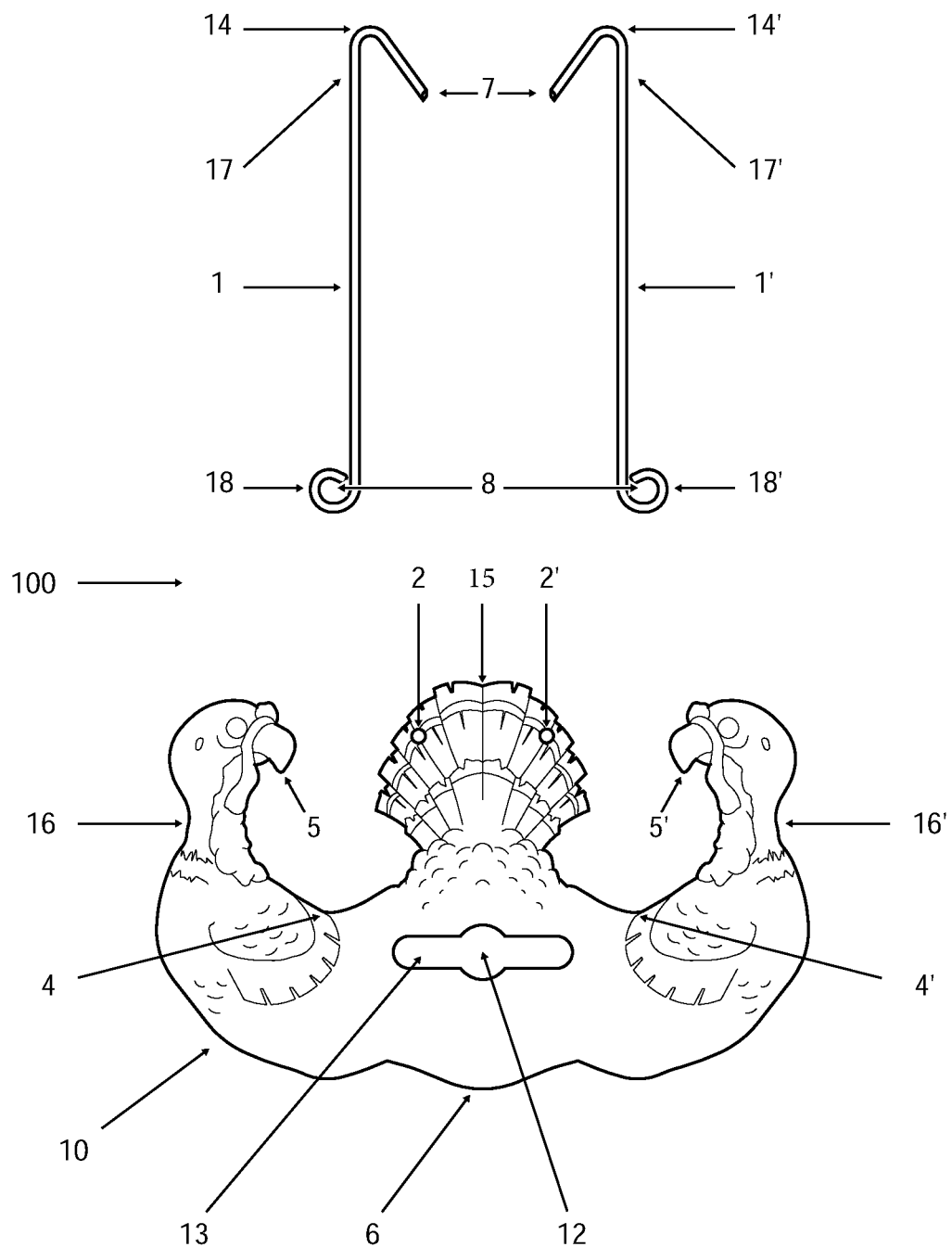
FIG. 11 illustrates individual components of the device illustrated in FIG. 2.

FIG. 11 illustrates a component view of the three primary components utilized to form the device that is shown in FIG. 2.

Figure 12:
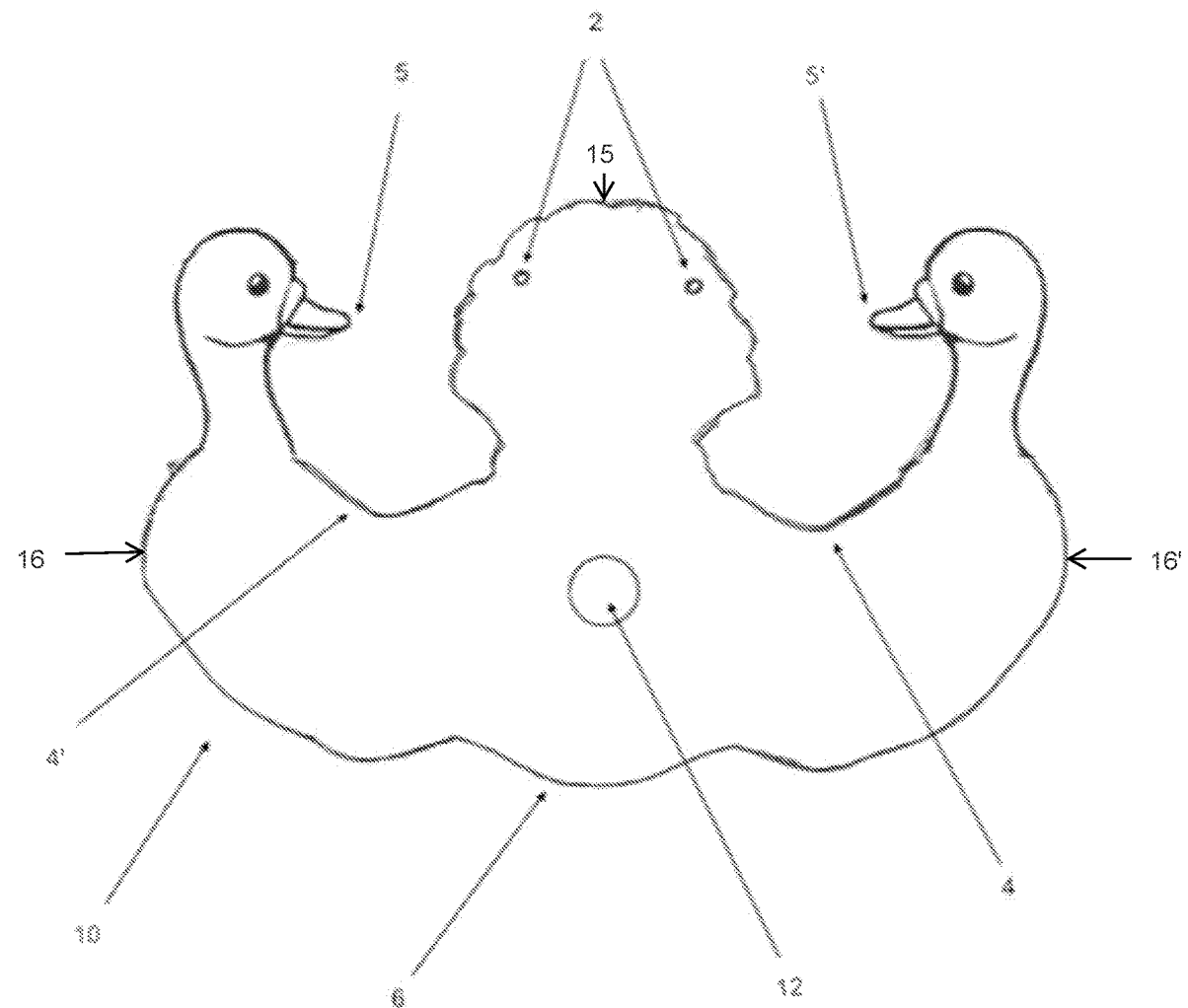
FIG. 12 is a further embodiment of a main body of the device.

FIG. 12 is a further embodiment illustrating the main body as including portions of a goose.

Figure 13:
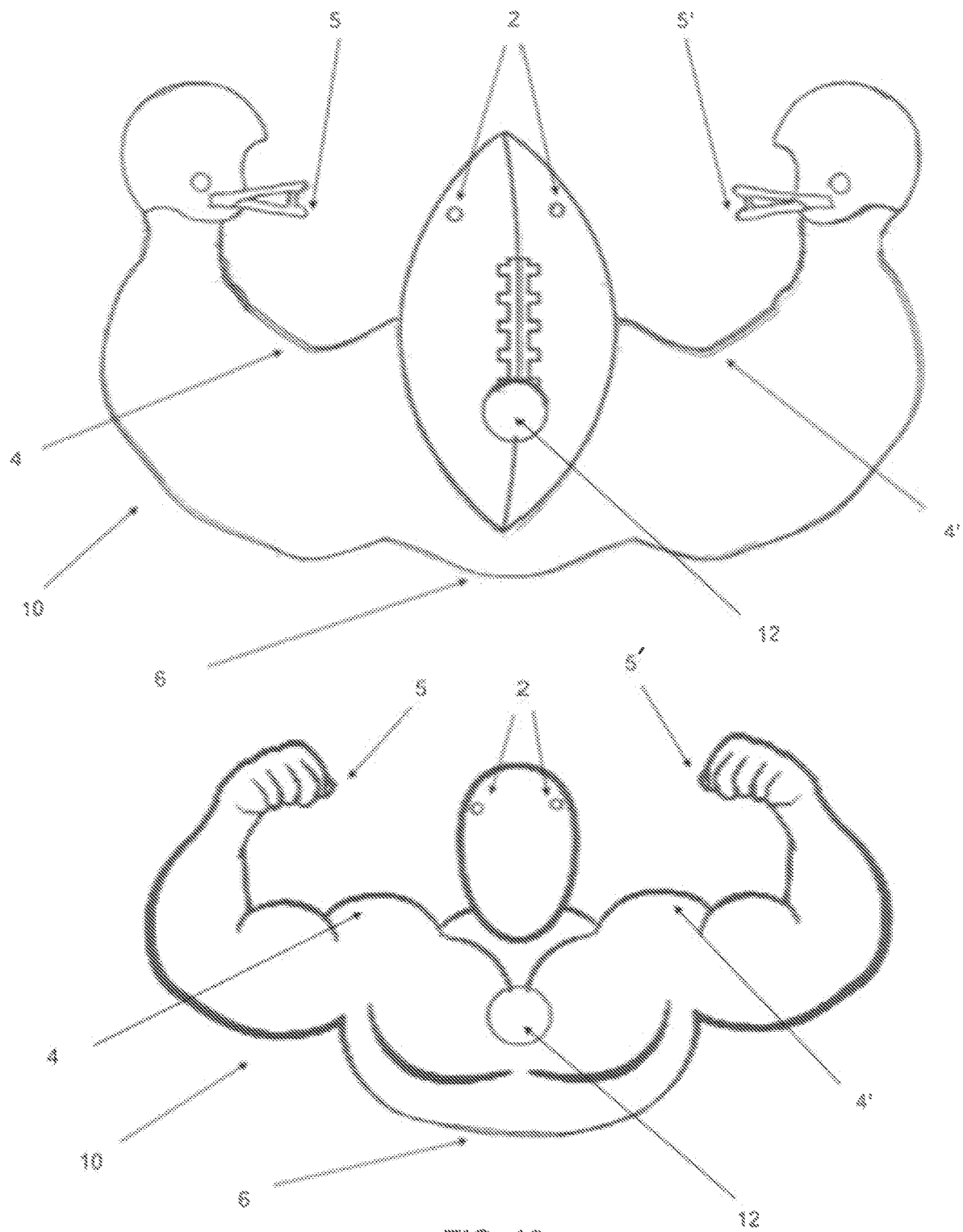
FIG. 13 illustrates two different embodiments of the main body of the device.

FIG. 13 illustrates a first main body including portions of a football helmet, with the face masks forming the leg locking points and a second main body depicting a creature flexing its muscles, with the arms thereof forming the leg locking points.

Figure 15:
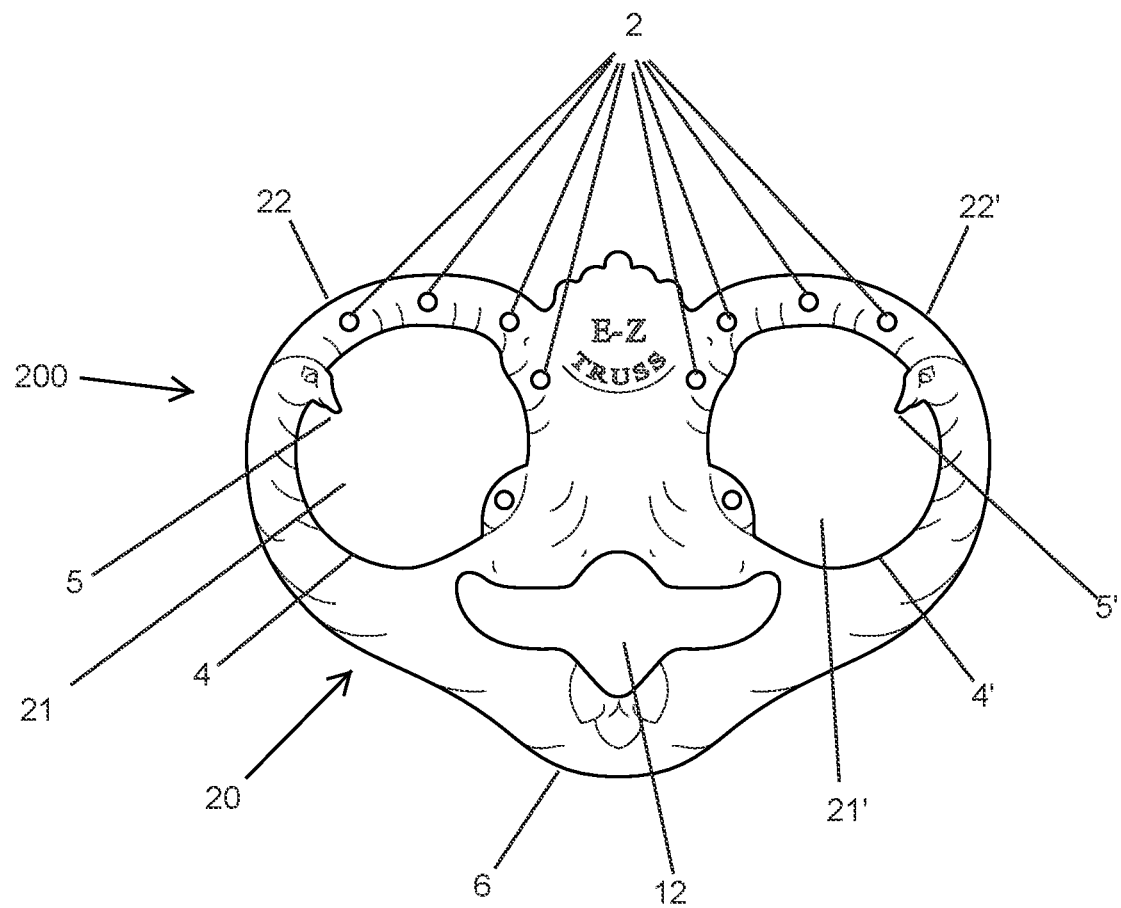
FIG. 15 is a front view of a further embodiment of a main body of a retaining device for trussing and cooking fowl.
Figure 16:
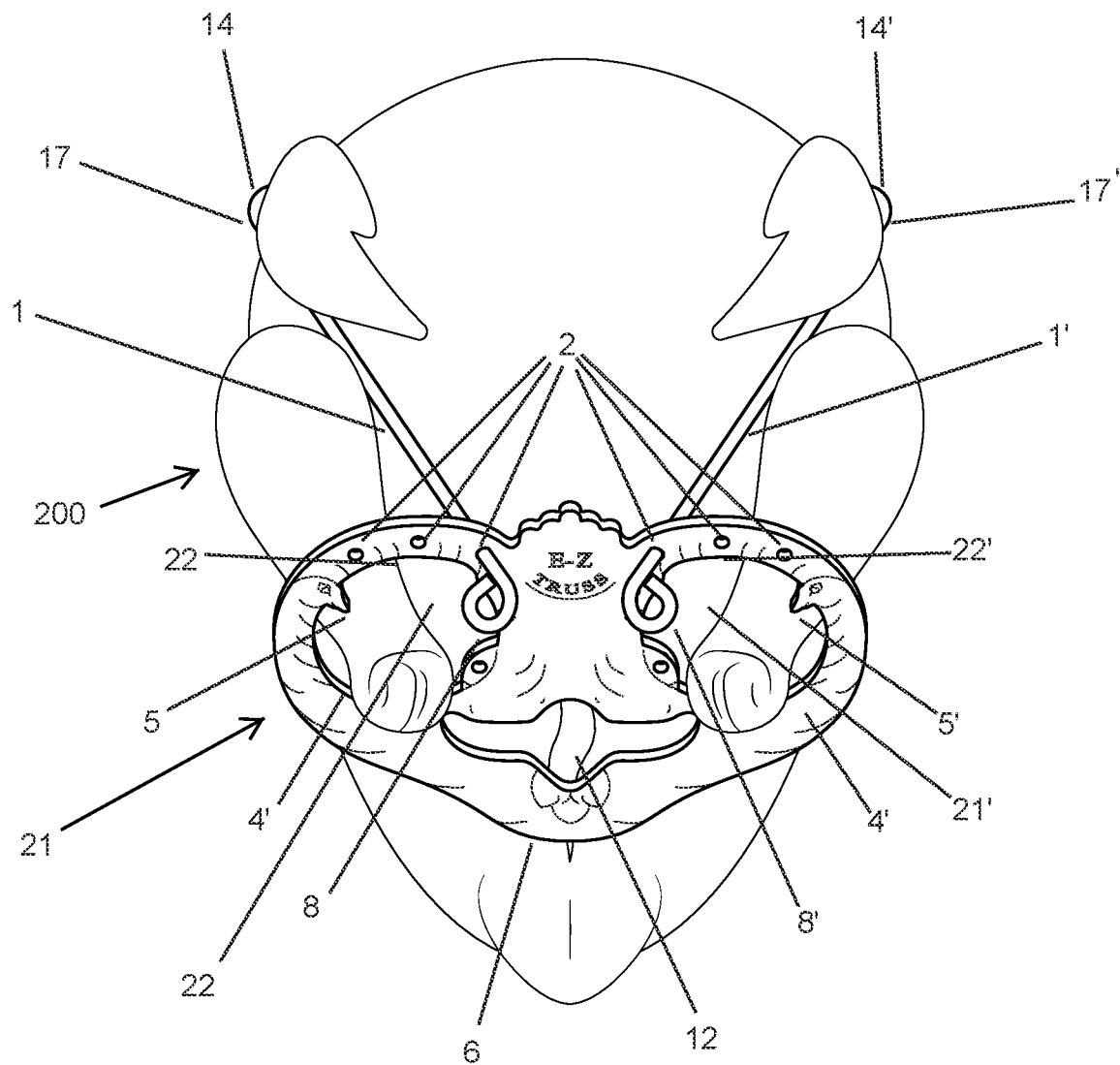
FIG. 16 is a downward-looking front perspective view of one embodiment of a device of the present invention including the main body of FIG. 15, the device having a fowl operatively connected thereto.

FIGS. 15 and 16 illustrate a further embodiment of a retaining device 200 for trussing and cooking fowl including a main body 20 generally constructed in the form of a plate having a lateral length, height and depth. The depth of the plate can vary depending upon the desired function and/or aesthetic appearance of the main body. The main body includes a first leg cradle 4 and a second leg cradle 4', with each leg cradle adapted to accept and hold the leg of a fowl. FIG. 16 shows a fowl, namely a chicken, arranged in relation to the device 200.

Main body 20 includes a central aperture 12, illustrated as a slot having an enlarged central portion. Central aperture 12 allows a spit, rod or the like to pass therethrough from a first, outer side to a second, inner side, with the inner side being adapted to be disposed adjacent a rear end of fowl.

Leg cradles 4, 4' are located between lateral ends of the plate, with the central aperture 12 having at least one portion located between first leg cradle 4 and second leg cradle 4', when considered in the lateral direction. The central aperture 12 is located below each leg cradle 4, 4' in a direction perpendicular to the lateral direction.

Each leg cradle 4, 4' includes apertures 21, 21', respectively, which are formed in the plate of main body 20. Apertures 21, 21' are generally circular and at least large enough to accommodate a part of a leg of a fowl. Each of the first leg cradle 4, 4' and second leg cradle 4, 4' includes an outer band 22, 22', respectively, located at an outer end of the plate. The bands form a portion of a perimeter of the leg cradle apertures 21, 21'. An advantage of providing a closed leg cradle is that legs will be maintained therein when the device is utilized on a rotisserie.

Outer bands 22, 22' each include a leg locking point 5 and 5', respectively. The leg locking point has a relatively wide base as compared to a tip of the leg locking point, with the tip extending further into the leg cradle apertures as compared to the base of the leg locking point which is connected to the outer band. The leg locking point aids in securing the leg of a fowl to the device 200. Preferably the leg locking points 5, 5' have a pointed tip.

Main body 20 further includes a wing lock carrier that includes multiple apertures 2 spaced from each other, with some of the apertures 2 being located adjacent first leg cradle 4 and others being located adjacent second leg cradle 4'. A portion of wing lock 1 passes through one of the wing lock carrier apertures 2 and a second portion of a second wing lock 1' passes through a wing lock carrier aperture 2 associated with the second leg cradle 4', see FIG. 16. In one embodiment, at least one wing lock carrier aperture 2 is located at a vertical height that is greater than or equal to the vertical height of the leg locking points 5, 5' and/or the upper most extent of the leg cradle apertures 21, 21'.

In one embodiment, an aperture 2 is provided on a projection of the main body extending into apertures 21, 21' generally opposite a respective leg locking point 5, 5'.

Main body 20 includes a butt rest 6 at a lower end of the main body 20.

In a preferred embodiment at least two, at least three, or at least four apertures are positioned adjacent a respective leg cradle in the shape of an arc. In a preferred embodiment, at least two or at least three apertures 2 are present in the outer band 22 and/or 22' in order to provide many options for trussing a fowl. The presence of many apertures allows desired positioning of wing locks 1, 1'. For example, apertures located closer to the outer lateral ends of main body 20 allow for connection to wings of larger birds. The apertures 2 that are more centrally located are adapted to be utilized on medium size fowl. The apertures 2 located closer to a center of the main body 20 can be utilized with smaller fowl. The structural arrangement of multiple apertures on body 20 eliminates the need for different-sized wing locks to be utilized for different-sized fowl. An advantage of providing a closed leg cradle is that legs will be maintained there within when the device is utilized on a rotisserie. First wing lock 1 and second wing lock 1' are constructed as described hereinabove.

In accordance with the patent statutes, the best mode and preferred embodiment have been set forth; the scope of the invention is not limited thereto, but rather by the scope of the attached claims.

What is claimed is:

1. A retaining device for trussing and cooking fowl, comprising:
   a main body including a plate having a first leg cradle, a second cradle and a central aperture, the central aperture adapted to allow a spit to pass through the main body from a first, outer side to a second, inner side;
   wherein the plate is adapted to be disposed adjacent a rear end of the fowl,
   wherein the first leg cradle and second leg cradle each including an aperture formed within the plate and each of the first leg cradle and the second leg cradle are adapted to at least accommodate a respective leg of the fowl, wherein the first leg cradle and second leg cradle are separated from the central aperture; and
   a first wing lock and a second wing lock, each of the first wing lock and the second wing lock are adapted for securing a respective wing of the fowl to a body of the fowl, each wing lock including a) a segment adjustably connected to the main body located at a first end of the wing lock and b) a wing pin located at a second end of the wing lock adapted to be passed through a portion of the fowl wing and the fowl body.

2. The device according to claim 1, wherein the first leg cradle and the second leg cradle are located between lateral ends of the plate, and wherein at least one portion of the central aperture is located between the first leg cradle and second leg cradle in the lateral direction.

3. The device according to claim 1, wherein each of the first leg cradle and the second leg cradle includes an outer band located at an outer end of the plate and form a portion of a perimeter of the leg cradle apertures, wherein the outer band includes a leg locking point that extends inwardly into the respective leg cradle aperture.

4. The device according to claim 1, wherein the plate includes a wing lock carrier including at least two apertures, wherein a portion of the first wing lock passes through one of the wing lock carrier apertures, wherein each of the first leg cradle and the second leg cradle includes an outer band located at an outer end of the plate and form a portion of a perimeter of the leg cradle apertures, and wherein at least one of the wing lock carrier apertures is located in the outer band.

5. The device according to claim 4, wherein the wing lock first end includes a stop larger than the wing lock carrier aperture that prevents the first end from being withdrawn from the wing lock carrier aperture through the wing lock first end.

6. The device according to claim 4, wherein the wing lock second end wing pin includes a bent segment having an angle less than 90° and wherein a distal end of the wing pin is located closer to the main body as compared to the bent segment.

7. The device according to claim 4, wherein the central aperture is located below the wing lock carrier in a direction perpendicular to the lateral direction.

8. The device according to claim 6, wherein a distance between the distal end of the wing pin and the main body is adjustable to accommodate different types and length of fowl.

9. The device according to claim 1, wherein the central aperture comprises a slot including an enlarged central portion.

10. The device according to claim 4, wherein the wing lock carrier includes at least two apertures located in the outer band of the first leg cradle and at least two apertures located in the outer band of the second leg cradle.

11. A retaining device for trussing and cooking fowl, comprising:
   a main body including a plate having a lateral direction and a height, the plate including a first leg cradle located at a first lateral end and a second leg cradle located at a second lateral end of the main body, wherein the first leg cradle and the second leg cradle each include an aperture formed within the plate and each of the first leg cradle and the second leg cradle are adapted to at least accommodate a respective leg of the fowl, wherein the first leg cradle and the second leg cradle each include an outer band that forms a portion of a perimeter of the first and second leg cradle apertures, the plate further including a wing lock carrier including at least two apertures spaced around the first leg cradle aperture and at least two apertures spaced around the second leg cradle aperture; and a first wing lock and a second wing lock, each of the first wing lock and the second wing lock are adapted for securing a respective wing of the fowl to the body of the fowl, each wing lock including a segment adjustably connected to an aperture of the wing lock carrier, wherein each wing lock includes a wing pin located at a second end of the wing lock adapted to be passed through a portion of a fowl wing and a fowl body.

12. The device according to claim 11, wherein the first leg cradle outer band includes a first leg locking point that extends inwardly from the band into the first leg cradle aperture, and wherein the second leg cradle outer band includes a second leg locking point that extends inwardly from the band into the second leg cradle aperture.

13. The device according to claim 11, wherein the plate includes a central aperture adapted to allow a spit to pass through the main body from a first, outer side to a second, inner side of the main body.

14. The device according to claim 11, wherein the first wing lock and the second wing lock each include a stop larger than the wing lock carrier aperture that prevents the first end from being withdrawn from the wing lock carrier aperture through the wing lock first end.

15. The device according to claim 11, wherein the wing lock second end wing pin includes a bent segment having an angle less than 90° and wherein a distal end of the wing pin is located closer to the main body as compared to the bent segment.

16. The device according to claim 15, wherein a distance between the distal end of the wing pin and the main body is adjustable to accommodate different types and length of fowl.

17. The device according to claim 13, wherein the central aperture is located below the wing lock carrier in a direction perpendicular to the lateral direction.

18. The device according to claim 17, wherein the central aperture comprises a slot including an enlarged central portion.

19. The device according to claim 11, wherein the wing lock carrier includes at least two apertures located in the outer band of the first leg cradle and at least two apertures located in the outer band of the second leg cradle.

* * * * *